United States Patent
Musselman (10) Patent No.: US 10,049,248 B1
(45) Date of Patent: Aug. 14, 2018

(54) POSITIVE PRESSURE ENCLOSURE FOR PARTICULATE EXCLUSION ON REFLECTING SURFACES

(71) Applicant: Amazon Technologies, Inc., Seattle, WA (US)

(72) Inventor: Wayne Musselman, Wanamingo, MN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/586,698

(22) Filed: May 4, 2017

(51) Int. Cl.
| | |
|---|---|
| G06F 19/00 | (2018.01) |
| G06K 7/10 | (2006.01) |
| G06K 19/06 | (2006.01) |
| G06K 7/14 | (2006.01) |
| G06Q 10/08 | (2012.01) |
| B65G 15/00 | (2006.01) |
| G02B 26/10 | (2006.01) |
| G02B 7/182 | (2006.01) |
| G02B 27/00 | (2006.01) |
| H04N 1/00 | (2006.01) |

(52) U.S. Cl.
CPC ......... G06K 7/10831 (2013.01); B65G 15/00 (2013.01); G02B 7/1821 (2013.01); G02B 26/105 (2013.01); G02B 27/0006 (2013.01); G06K 7/1098 (2013.01); G06K 7/10762 (2013.01); G06K 7/10861 (2013.01); G06K 7/1413 (2013.01); G06K 19/06028 (2013.01); G06Q 10/087 (2013.01); H04N 1/00909 (2013.01)

(58) Field of Classification Search
CPC .......... G06K 7/10831; G06K 7/10762; G02B 26/105; G02B 27/0006; B65G 15/00; G06Q 10/087; B41J 29/12; H04N 1/00909
USPC ........................................................ 235/385
See application file for complete search history.

(56) References Cited

U.S. PATENT DOCUMENTS

| | | | |
|---|---|---|---|
| 5,046,797 A * | 9/1991 | Kurisu ................. | G02B 26/121 359/196.1 |
| 5,255,256 A * | 10/1993 | Engler ................. | G11B 33/142 360/99.06 |
| 5,729,793 A * | 3/1998 | Inoue ....................... | B41J 29/12 347/138 |
| 5,946,078 A * | 8/1999 | Morimoto .............. | B41J 29/377 355/30 |

(Continued)

*Primary Examiner* — Claude J Brown
(74) *Attorney, Agent, or Firm* — Kilpatrick Townsend & Stockton LLP (57) ABSTRACT

An enclosure for a mirror may include a first passage, a second passage, and a third passage. The mirror may be positioned within the enclosure at an angle that causes light received in through the second passage to be reflected out through the third passage. The first passage may be coupled with a gas flow system, e.g., for supplying gas flow out through at least the second passage. In operation, the enclosure may be located below a gap between conveyors and permit light from an item over the gap to be passed downwardly through the gap, passed through the second passage, reflected by the mirror, and passed through the third passage to an optical sensor, while gas flow is provided through the second and/or third passage to exclude dust that might otherwise reach the mirror and block reflection of light from the item to the sensor.

20 Claims, 4 Drawing Sheets

(56) References Cited

U.S. PATENT DOCUMENTS

| | | | | |
|---|---|---|---|---|
| 6,339,491 B1* | 1/2002 | Kondou | ............... | B41J 29/13 |
| | | | | 347/261 |
| 8,997,972 B2* | 4/2015 | Ryabinin | ............ | G06K 7/10861 |
| | | | | 198/600 |
| 9,230,146 B1* | 1/2016 | Guidetti | ............... | G02B 27/028 |
| 2011/0181721 A1* | 7/2011 | Bloom | ............... | B61K 9/08 |
| | | | | 348/148 |
| 2012/0187195 A1* | 7/2012 | Actis | ............... | G07G 1/0045 |
| | | | | 235/479 |
| 2013/0292470 A1* | 11/2013 | Shearin | ............... | G06K 7/1465 |
| | | | | 235/437 |

* cited by examiner

POSITIVE PRESSURE ENCLOSURE FOR PARTICULATE EXCLUSION ON REFLECTING SURFACES

BACKGROUND

Modern order fulfillment warehouses use a variety of automated process to achieve operational efficiencies. For example, items may be introduced and automatically registered into inventory records by movement past automatic scanners while being moved by automated conveyors. Such arrangements are often faster, more efficient, and/or less costly than processes that rely on human operators to manually scan items with handheld scanners. However, automated systems may occasionally miss or otherwise be unable to automatically register items, which may result in a need for the more expensive, slower, and/or less efficient intervention by human operators to ensure proper handling of items that automated systems fail to adequately address.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
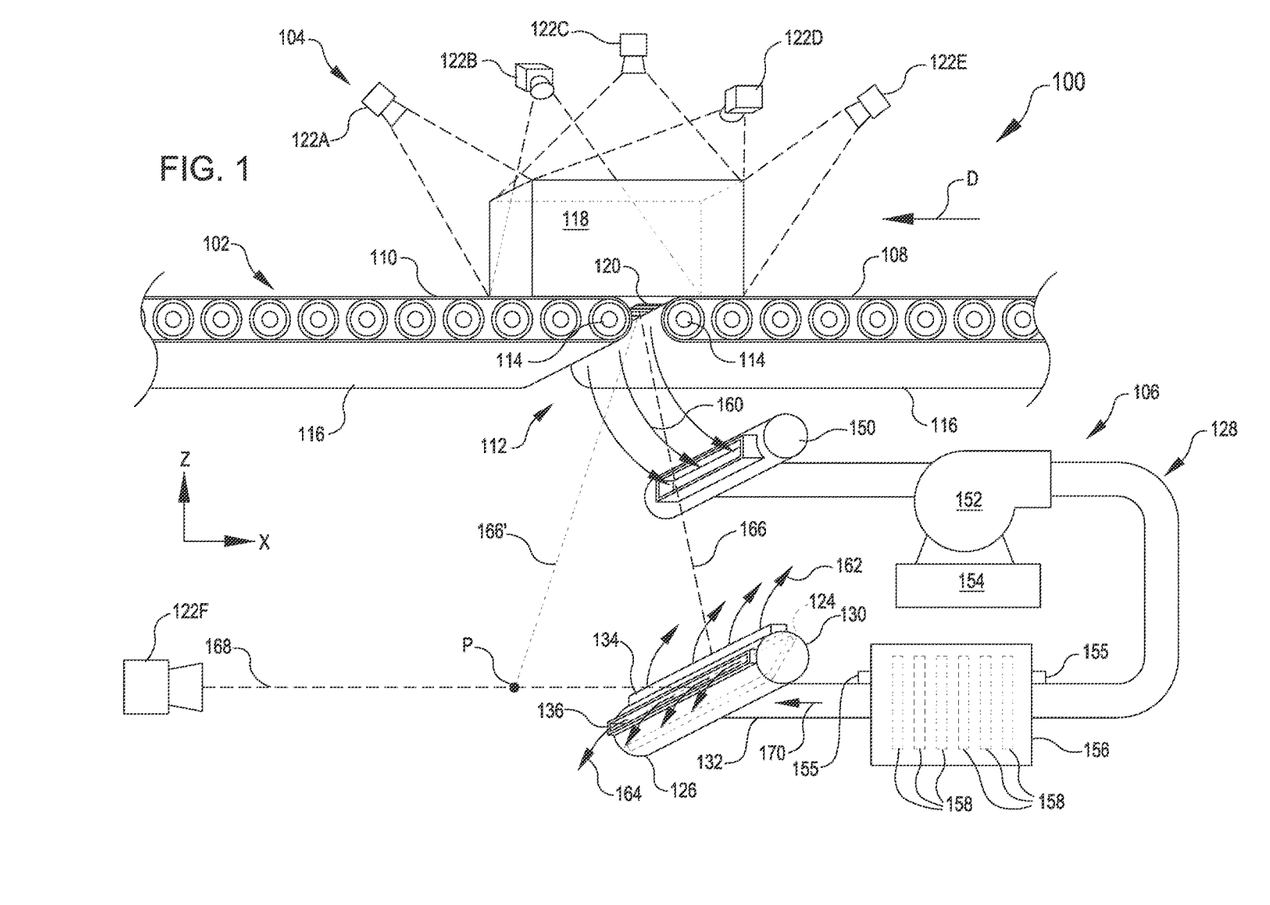
FIG. 1 illustrates an example of a system that includes an enclosure positioned about a mirror to provide gas flow along sightlines of the mirror so as to inhibit dust accumulation on the mirror according to certain embodiments.

Various embodiments herein are directed to scanning systems which may be utilized, for example, to automatically detect items being inducted into an inventory system or otherwise processed within an inventory system. The system can include a reflective surface, such as a reflective surface of a mirror that is arranged to reflect light reflected off of an item representative of a bar code or other identifying information. A sensor such as a camera receives light reflected off the mirror. For example, as shown in FIG. 1, the mirror may be positioned vertically below and horizontally offset from a gap between conveyors. Light from the bottom of an item travels along an incident ray to the mirror (e.g., along ray I in FIG. 3). The mirror then reflects the incident ray along a reflected ray (e.g., along ray R in FIG. 3) so as to reflect that light toward a camera. Because the mirror reflects the light from the item, the camera can still sense the light without being disposed directly underneath the gap. Moreover, because the incident ray and reflected ray may be adjusted by the position of the mirror, the mirror can also still reflect the light without being disposed directly underneath the gap. Offsetting the camera as well as the mirror minimizes the amount of debris and dust that falls on the camera and mirror through the gap.

The mirror may be further protected from dust by an enclosure that inhibits dust from reaching its reflective surface while also providing passage of the incident and reflective rays from the item. Specifically, the enclosure may include an upper passage that enables light from the item to pass through along the incident ray and another, lateral passage that enables light reflected off the reflective surface to pass along the reflected ray to the camera. A gas flow system may provide air or other gas flow through the enclosure such that gas flow travels through the upper and lateral passages in order to blow away or otherwise displace dust and debris. In this way, the enclosure inhibits and/or minimizes accumulation of dust and debris on the mirror while enabling the camera to read the information from the item as it passes over the gap in the conveyors.

In some embodiments, the lateral passage may be covered with a transparent or otherwise light-permeable barrier that enables passage of light between the mirror and the camera along the reflected ray, but minimizes, inhibits, or prevents gas flow. Relative to systems in which gas flow travels through the upper and lateral passages, such an arrangement reduces gas flow capacity utilized from the gas flow system because gas flow is only being pushed out through the upper passage. The barrier may be angled and/or situated at least partially under an overhang of the lateral passage so that the overhang or angle of the barrier minimizes or inhibits accumulation of dust and debris on the barrier.

In various embodiments, the gas flow system may include an intake for receiving air or other gas to be provided through the gas flow system. As shown, for example, in FIG. 1, the intake may be positioned proximate the gap so that the air or other gas being pulled into the intake causes a gas flow disturbance that moves dust and debris falling through the gap away from a direct drop path towards the mirror. The gas flow system may include other features such as a blower or motor to move air or other gas from the intake to the enclosure and out of one or both of the exhaust passages. The gas flow system may include HEPA filtration or other single or multiple stage filtration to reduce a size of particles that are introduced into the enclosure.

In various embodiments, the enclosure may define a body that can be opened to permit access to reach the mirror, e.g., to clean the mirror in cases in which the mirror has been fouled by liquid droplets or other particulate that is sufficiently heavy to not be displaced from a path of reaching the mirror by the gas flow exiting the enclosure. For example, the enclosure may feature a door, hatch, or other access-providing feature to this end.

An example system 100 (which may correspond to a scanning assembly) is shown in FIG. 1 with a conveying system 102, a scanning system 104, and a dust management system 106. In operation, the conveying system 102 moves items 118, the scanning system 104 scans items 118 moved by the conveying system 102, and the dust management system 106 minimizes or inhibits contamination of the scanning system 104 that would otherwise inhibit the scanning system 104 from accurately performing the scanning function. A set of reference axes X and Z are also shown in FIG. 1 to facilitate discussion of relative directions of elements, such as in the positive X-direction (e.g., toward the right of FIG. 1), the negative X-direction (e.g., toward the left of FIG. 1), the positive Z-direction (e.g., toward the top of FIG. 1), and the negative Z-direction (e.g., toward the bottom of FIG. 1).

The conveying system 102 may include any structure for conveying or transporting items 118. In FIG. 1, the conveying system includes a first conveyor 108 separated from a second conveyor 110 by a gap 112. The first conveyor 108 and the second conveyor 110 are configured to move items 118 along a direction D (e.g., which is depicted parallel to the negative X-direction). Although each of the first conveyor 108 and the second conveyor 110 are shown as belts 116 advanced over rollers 114, any other forms of conveyors may be utilized, including, but not limited to rollers alone, belts alone, vibratory tables, robotic arms, cranes, overhead picking systems, or any other structure that can advance an item 118 brought into interaction therewith. Additionally, conveying system 102 may include a single conveyor that defines a gap 112. The conveying system 102 additionally or alternatively may move items 118 relative to a gap 112, relative to a reflective surface, relative to a camera, or relative to any other feature.

The second conveyor 110 may be aligned with the first conveyor 108 so as to receive items 118 conveyed by the first conveyor 108. The gap 112 may be sized to enable at least a part of an underside of the item 118 to be visible through the gap 112 when the item 118 is being passed from the first conveyor 108 to the second conveyor 110 along direction D. For example, in some embodiments, the gap 112 may have a width measured along direction D that is between 0.5 cm and 3 cm so as to accommodate items 118 having a narrowest side ranging from 10 cm to 100 cm. Other representative value ranges may also be utilized. The sizing of the gap 112 enables item identifying indicia 120, such as a label, to be visible or readable from an underside of the first conveyor 108 and the second conveyor 110. The indicia 120 may be affixed to the item 118 with a sticker, printed directly on the item 118 using ink, or formed using any other medium for displaying characters, symbols, etc. In addition to extending in a first direction (e.g.,), the gap 112 may also extend in a second direction that is perpendicular to the first direction (e.g., the gap 112 may extend along a direction parallel the negative Z-direction in addition to extending along the D-direction or parallel the negative X-direction).

The scanning system 104 in FIG. 1 includes six sensors 122 (individually identified as a front sensor 122A, a right sensor 122B, a top sensor 122C, a left sensor 122D, a rear sensor 122E, and a bottom sensor 122F). The sensors 122 may be arranged to capture information from any combination of a rear side, left side, top side, right side, front side, and/or bottom side of the item 118. In the depicted arrangement, each sensor 122 provides information about a respective side of the item 118. However, in other embodiments, one or more of the sensors 122 may be arranged to obtain information about more than one side of the item 118, e.g., which enables information about multiple sides of the item 118 to be obtained without a corresponding designated sensor 122 for each side. Accordingly, other numbers and/or arrangements of the sensors 122 can be utilized other than those specifically shown in FIG. 1.

Any of the sensors 122 may be optical sensors that utilize light reflected off of the item 118 to collect information about the item 118. Non-limiting examples may include cameras that utilize reflected ambient light or cameras that use light reflected from a laser or other light source provided with known parameters that can be compared to reflections to obtain information about changes that occurred based on the interaction with an item 118.

In some embodiments, a reflective surface, such as a reflective surface of a mirror (hereinafter mirror 124) reflects light from an item 118 to a sensor 122. For example, the mirror 124 may reflect light reflected from the item 118 and/or may reflect light projected toward the item 118 to cause the reflection from the item 118. Use of the mirror 124 enables a sensor to be positioned apart from a direct line of sight of a relevant portion of the item 118. For example, in the arrangement depicted in FIG. 1, the mirror 124 is positioned to reflect light for the bottom sensor 122F. As a result, the bottom sensor 122F can be positioned laterally offset from the gap 112 (e.g., off to the side) and still receive light travelling downward through the gap 112. Such an arrangement may be useful, for example, to allow the bottom sensor 122F to be positioned an adequate distance away based on the field of view of the bottom sensor 122F without requiring boring a hole in the floor, elevating the first conveyor 108 and the second conveyor 110, or introducing some other corresponding altitude difference between the bottom sensor 122F and the gap 112. For example, the bottom sensor 122F may correspond to a line scanning camera designed to obtain lines of data from a predetermined distance away from a target object, and use of the mirror 124 may allow the predetermined distance to be achieved within other space parameters related to the conveying system 102. As a non-limiting example, if a line scanning camera is calibrated to obtain an image from 180 cm away, rather than being positioned at a vertical offset 180 cm below the gap 112, the line scanning camera may instead be vertically offset by 30 cm below the gap 112 and laterally offset by 180 cm from a mirror that is also positioned 30 cm below gap 112.

The dust management system 106 shown in FIG. 1 includes an enclosure 126 and a gas flow system 128. The enclosure 126 is depicted in FIG. 1 in an arrangement in which the mirror 124 is arranged within the enclosure 126. For example, as depicted in FIG. 1, both the mirror 124 and the enclosure 126 are illustrated at a position vertically offset (e.g., downward, or parallel the negative Z-direction) from the gap 112 and aligned with the bottom sensor 122F that is both vertically offset and laterally offset away from the gap 112 (e.g., offset parallel the negative Z-direction and offset parallel the negative X-direction).

The illustrated enclosure 126 includes a body 130 penetrated by a first passage 132, a second passage 134, and a third passage 136. These features are also visible and explained in greater detail with respect to FIG. 2.

Figure 2:
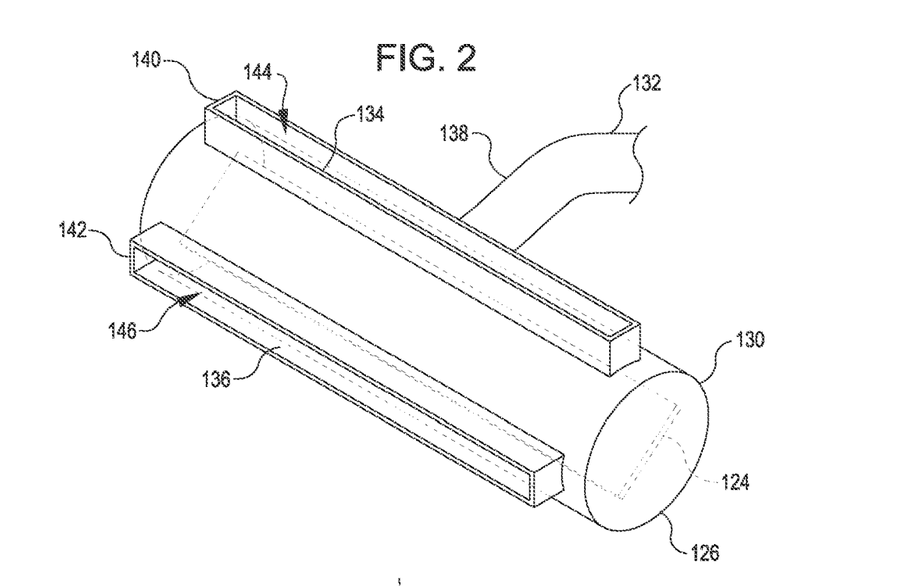
FIG. 2 illustrates a perspective view of an example of an enclosure that may be utilized in the system of FIG. 1 according to certain embodiments.

FIG. 2 illustrates a perspective view of the enclosure 126. In the arrangement shown in FIG. 2, the first passage 132 is defined at least in part by a first projection 138 (e.g., a pipe or hose) extending away from the body 130, the second passage 134 includes a slot 144 defined at least in part by a second projection 140 (e.g., a rectangular rim) extending away from the body 130, and the third passage 136 includes another slot 146 defined at least in part by a third projection 142 (e.g., another rectangular rim) extending away from the body 130. In various embodiments, structure extending away from the body 130 may guide air outward away from an interior of the enclosure 126 and reduce a risk of dust or other particulate being entrained by vortices or other turbulence in a manner that might suck dust through a respective opening into the enclosure 126 where the particulate might foul the mirror 124. However, the respective first passage 132, second passage 134, and third passage 136 are not so limited, and may equally correspond to any other structure that can provide the functions of providing air and/or light passage as described elsewhere herein. For example, either or both of respective slots 144 and 146 may be provided directly in a body 130 of the enclosure in the absence of corresponding projections 140 or 142. Additionally, although the body 130 is depicted as a tube or cylinder, the body 130 may correspond to any other suitable form factor, including, but not limited to, cuboidal, rectangular, irregular, or corresponding to other shapes.

Figure 3:
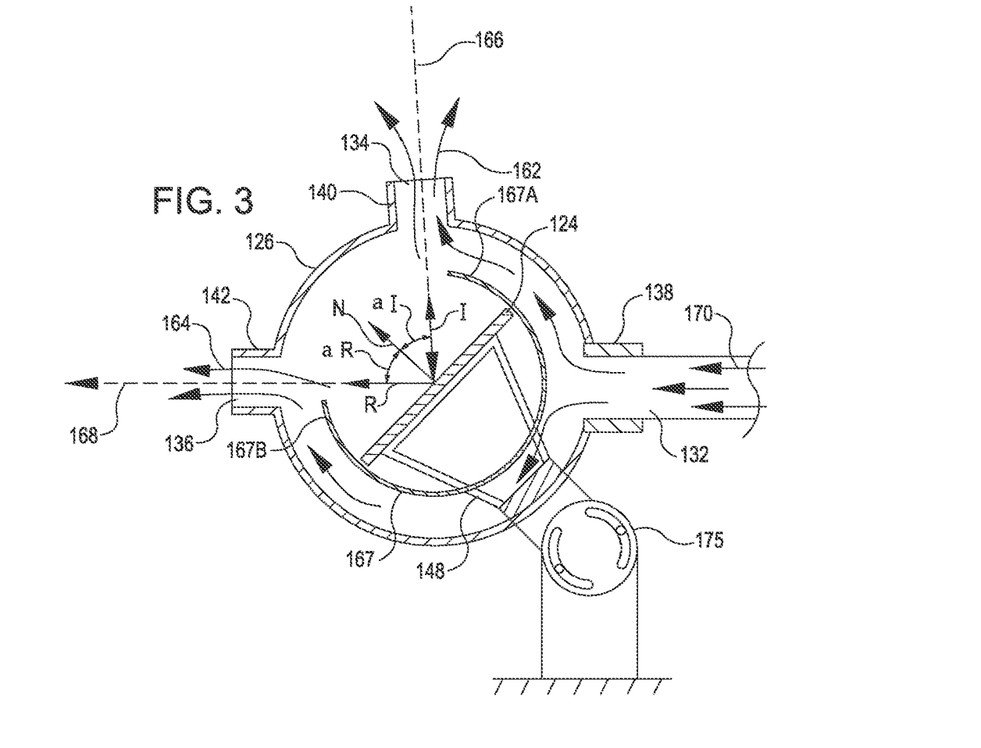
FIG. 3 is a cross-sectional view illustrating gas flow through an example of an enclosure that may be utilized in the system of FIG. 1 according to certain embodiments.

FIG. 3 is a side view illustrating an example of light and gas flow through the enclosure 126. Reference is made relative to several arrows that are labeled with like numbers in FIG. 1 and FIG. 3. In operation, the first passage 132 may be coupled with the gas flow system 128, for example, to supply air or other gas at a positive pressure into the enclosure 126, as illustrated by arrow 170. Although any gas other than air (including, but not limited to carbon dioxide, oxygen, nitrogen, or other readily available gasses) may be used by the gas flow system 128, for the sake of simplicity, description hereinafter may refer specifically to air, although it should be understood that such references to air may equally apply to other types and/or mixtures of gasses. Accordingly, hereinafter, the first passage 132 may alternatively be referred to as the air inlet 132.

The depicted second passage 134 is located on an upper or top portion of the enclosure 126 and is open so that gas flow may exit the enclosure 126 through the second passage 134 (e.g., as illustrated by arrows 162) in response to the air at positive pressure being introduced into the enclosure 126 through the air inlet 132. Accordingly, hereinafter, the second passage 134 may alternatively be referred to as the upper exhaust passage 134 or first outlet 134.

The depicted third passage 136 is shown located on a lateral side portion of the enclosure 126 and is open so that gas flow may exit the enclosure 126 through the third passage 136 (e.g., as illustrated by arrows 164) in response to the air at positive pressure being introduced into the enclosure 126 through the air inlet 132. Accordingly, hereinafter, the third passage 136 may alternatively be referred to as the lateral exhaust passage 136 or second outlet 136.

Figure 6:
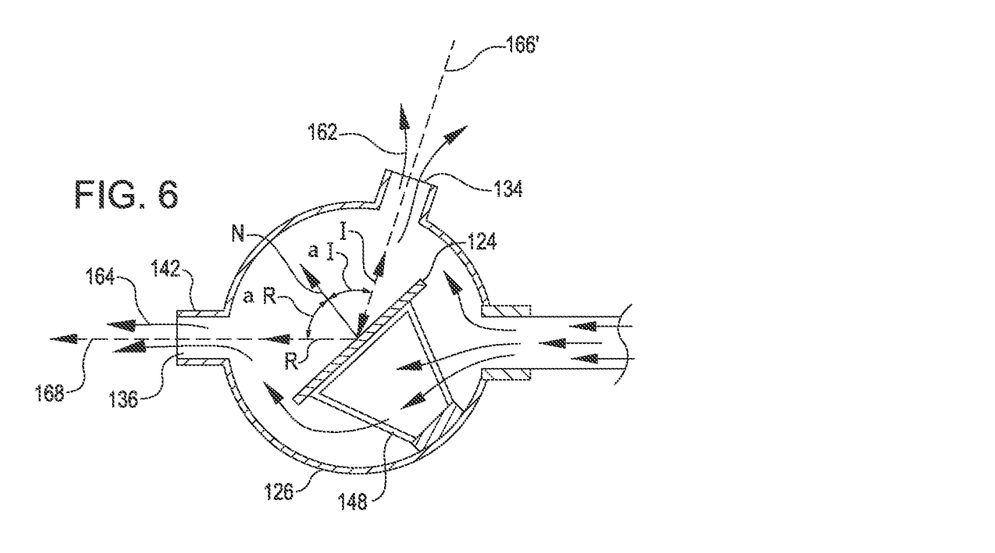
FIG. 6 is a cross-sectional view illustrating light reflection through an example of an enclosure that may be utilized in the system of FIG. 1 according to certain embodiments.

The mirror 124 may include appropriate features for reflecting light. For example, the mirror can have a surface of reflection that defines a plane. The plane can have a reflection point that defines a first line that extends normal to the plane from the reflection point (e.g., depicted by the normal line N in FIG. 3). In use, light may travel toward the mirror 124 along a second line (e.g., depicted by the incident ray or line I in FIG. 3) that extends to the reflection point and forms a first angle $\alpha I$ with the first line N. Reflected light may travel away from the mirror 124 along a third line (e.g., depicted by the reflected ray or line R in FIG. 3) that extends from the reflection point and forms a second angle $\alpha R$. The incident or first angle $\alpha I$ can be equal to the reflected or second angle $\alpha R$. As shown in FIG. 3, the first angle $\alpha I$ and the second angle $\alpha R$ are each less than 45 degrees. This may provide an alignment suitable for the camera 122F and the mirror 124 to be on opposite sides of the gap 112 and provide adequate reflection for the camera 122F to register an image from the gap 112, such as shown in FIG. 1. In some aspects (for example, as shown in FIG. 6), the first angle $\alpha I$ and the second angle $\alpha R$ may each be more than 45 degrees. Such an arrangement may provide an alignment suitable for the camera 122F and the mirror 124 to be on the same side of the gap 112 (e.g., both to the left of the gap in FIG. 1) and provide adequate reflection for the camera 122F to register an image from the gap 112, such as if the arrangement from FIG. 6 were placed at point P in FIG. 1.

Features of the enclosure 126 may be arranged to permit and direct passage of light. For example, the enclosure 126 may be arranged so that the incident ray I extends through the first outlet 134 and so that the reflected ray R extends through the second outlet 136. In operation, the second passage 134 may be aligned to receive light reflecting from the indicia 120 of the item 118 through the gap 112 (e.g., along path 166 in FIG. 1). The third passage 136 may be aligned with the bottom sensor 122F so that light can pass between the bottom sensor 122F and the mirror 124 (e.g., along path 168 in FIG. 1). For example, as may be appreciated by arrows 166 and 168 in FIG. 3 that correspond to the paths 166 and 168 in FIG. 1, light from the indicia 120 of the item 118 may pass downwardly through the gap 112, pass in through the second passage 134, reflect off of the mirror 124, and be directed out through the third passage 136 toward the bottom sensor 122F. As best seen in FIG. 3, the mirror 124 may be coupled or otherwise secured to a mount 148 within the enclosure 126 so that the mirror 124 is positioned at an appropriate angle to cause the light received in through the second passage 134 (as at 166) to be reflected out (as at 168) through the third passage 136 by the mirror 124. Although the mount 148 is depicted as a set of arms supporting the mirror 124, the mount 148 may correspond to any appropriate structure for securing the mirror 124 and permitting gas flow through the enclosure 126.

In some embodiments, the mount 148 may be adjustable. For example, the mount 148 in FIG. 3 is shown coupled with an adjustable base 175. The adjustable base 175 is shown as including a pivot, but may correspond to any other structure that can enable re-positioning of the mirror 124, e.g., for calibrating an alignment of the mirror 124 relative to the gap 112 and/or camera 122F. The mount 148 shown in FIG. 3 is also shown extending through the enclosure 126. Such an arrangement may be a result of the mount 148 corresponding to a pre-existing structure for a scanning system that is retrofit with an enclosure 126 e.g., for dust-exclusion purposes. However, other variations of the mount 148 are also possible, including, but not limited to mounts 148 that are fabricated as an original part of the enclosure 126 or mounts 148 that do not penetrate the enclosure 126.

Referring to FIGS. 1 and 3, in operation, travel of dust or other particulate along the same paths as light passing through the enclosure 126 may be minimized or inhibited. For example, light travels on an incident ray R (as at 166) from the indicia 120, through the gap 112, and into the upper exhaust passage 134. Dust or other particulate that also falls through the gap 112 may encounter the air exiting the upper exhaust passage 134 (as illustrated by arrows 162) and be prevented from travelling the same path into the enclosure 126 through the upper exhaust passage 134. Similarly, while on one hand light may travel a path (as at 168, e.g., along the reflected ray R) between the mirror 124 and the bottom sensor 122F, on the other hand, dust or other particulate that may fall through the gap 112 or otherwise be present nearby the enclosure 126 may encounter the air exiting the lateral exhaust passage 136 (as illustrated by arrows 164) and be prevented from travelling into the enclosure 126 through the lateral exhaust passage 136.

Other features are also shown in FIG. 3. For example, FIG. 3 also shows a baffle system 167. The illustrated baffle system 167 includes a single curved structure that has a first baffle portion 167A (for directing gas flow away from the mirror 124 and toward the upper exhaust passage 134) and a second baffle portion 167B (for directing gas flow away from the mirror 124 and toward the lateral exhaust passage 136). However, the baffle system 167 may include any suitable single or multiple structures for directing gas flow within the enclosure 126. In some arrangements, the baffle system 167 may result in a static or otherwise fairly undisturbed zone of gas adjacent the reflective surface of the mirror 124, e.g., which may reduce wear and tear on the mirror 124.

Referring again to FIG. 1, the gas flow system 128 may include any suitable components for providing air to the enclosure 126. In FIG. 1, the gas flow system 128 is further shown including an intake 150, a pump 152, a motor 154, pressure transducers 155, and a filtration assembly 156.

In operation, the intake 150 may receive air for use in the gas flow system 128. The intake 150 may correspond to an interface at which a suction effect is present to pull air into the gas flow system 128. In some embodiments, the intake 150 may be arranged adjacent or proximate to the gap 112 so that air disturbances caused by the suction of the intake can provide additional air movement (e.g., as illustrated by arrows 160 in FIG. 1) that may act on particulate falling through the gap 112 and move that particulate away from a path that might otherwise allow the dust or other particulate to fall toward the enclosure 126 or the mirror 124.

The motor 154 may operate the pump 152. The pump 152 may increase a pressure of the air provided by the gas flow system 128. For example, the pump 152 may provide suction at the intake 150 and positive pressure for the air provided into the enclosure 126 through the air inlet 132. In some embodiments, the motor 154 may include a variable speed drive capable of adjustment to vary a level of gas flow provided by the gas flow system 128. For example, an amount of energy provided to such a variable speed drive may be adjusted to change an amount of gas flow. The variable speed drive may enable efficient operation, e.g., using only as much energy as needed to provide a suitable level gas flow for excluding particulate from the enclosure 124.

The filtration assembly 156 may include filters 158 for screening out particulate provided by the gas flow system 128 to the enclosure 126. Such screening minimizes or inhibits particulate that reaches the mirror 124 via the gas flow system 128. As an illustrative example, in a situation in which allowing particulate having a size of ten microns or larger to accumulate on the mirror 124 may be sufficient to cause disruption to the ability of a bottom sensor 122F to accurately read a indicia of an item 118, a filtration assembly 156 featuring HEPA multi-stage filtration (which typically screens particles to less than a single micron in size) may be an effective element to include to minimize or inhibit fouling of the mirror from the gas flow system 128.

In some embodiments one or more pressure transducers 155 may provide input about gas flow levels provided by or within the gas flow system 128. For example, input from a pressure transducer 155 may be utilized to compensate for filter efficiencies or seal efficiency changes. In some embodiments, operating parameters of the motor 154 and/or other components of the gas flow system 128 may be adjusted or otherwise controlled based on input from the pressure transducer 155. Although FIG. 1 illustrates one pressure transducer 155 on an inlet side and another pressure transducer 155 on an outlet side of the filtration assembly 156 (e.g., which may provide information about a pressure loss or other differential resulting from passage through the filtration assembly 156), the gas flow system 128 may additionally or alternatively include any other suitable number and/or arrangement of pressure transducers 155. In some embodiments, input from one or more pressure transducers 155 may enable alarming for particular conditions, such as if detected gas flow conditions were consistent with a filter 158 or other component of the gas flow system 128 becoming blocked or consistent with the presence of a leak or other escape of gas flow (e.g., such as if the enclosure 126 were left in an open state following cleaning of the mirror 130).

Figure 4:
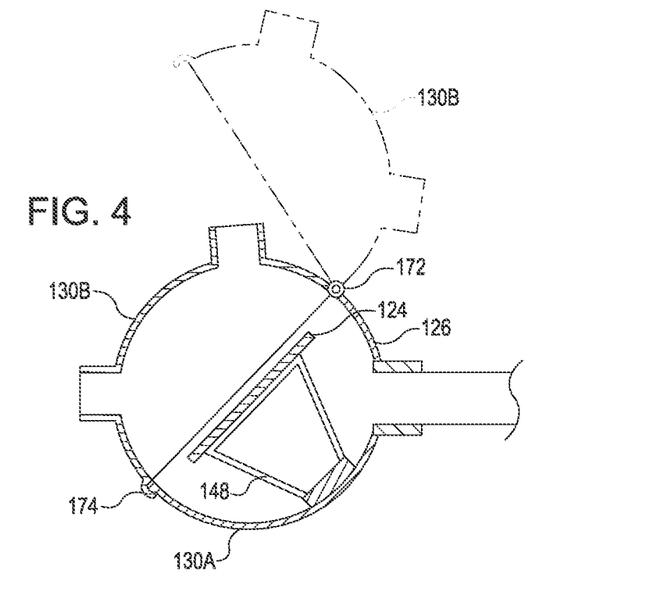
FIG. 4 is a cross-sectional view illustrating an example of an access feature that may be included in an enclosure that may be utilized in the system of FIG. 1 according to certain embodiments.

Referring to FIG. 4, the enclosure 126 may include features that permit access to the mirror 124 other than through the first passage 132, the second passage 134, or the third passage 136. For example, in FIG. 4, the body 130 is shown including a first body portion 130A that is releasably connected to a second body portion 130B so as to be selectively separable from the first body portion 130A. A hinge 172 is shown in FIG. 4 to enable relative movement of the first body portion 130A to the second body portion 130B, while a clasp 174 for securing the body 130 in a closed state is shown opposite the hinge 172, but the enclosure 126 may additionally or alternatively include any other features for permitting the body 130 to move between an a closed, sealed state and an open, accessible state or to secure the body 130 in either state. Including such access-providing features for the enclosure 126 enables the enclosure 126 to be opened, which can enable access for cleaning the mirror 124 to be cleaned, such as for regular maintenance or for special cleaning if a liquid droplet or other particulate object that is too heavy to be blown away by gas flow exiting the enclosure 126 reaches the mirror 124 through the lateral exhaust passage 136 and/or the upper exhaust passage 134.

Figure 5:
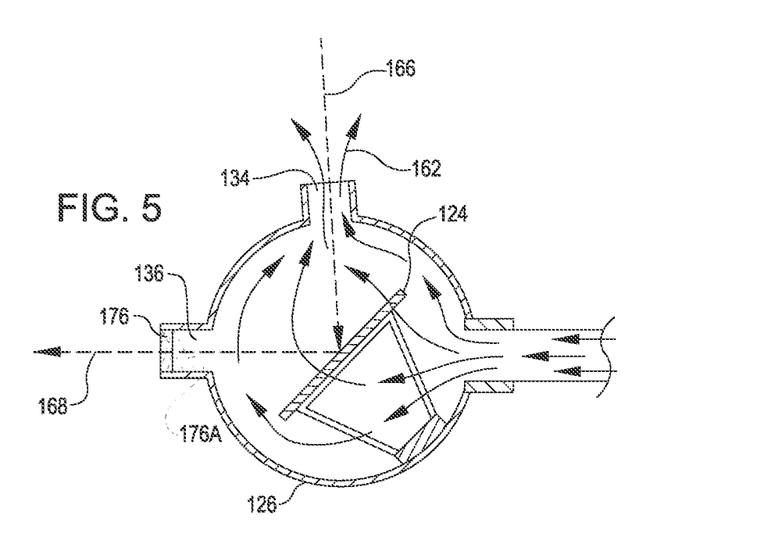
FIG. 5 is a cross-sectional view illustrating an example gas flow through an enclosure that may be utilized in the system of FIG. 1 according to certain embodiments.

Referring to FIG. 5, in some embodiments, gas flow may be prevented from passing through a respective passage out of the enclosure. For example, as shown in FIG. 5, a light-permeable barrier 176 may be positioned in the third passage 136. The light-permeable barrier 176 may be formed of glass, plastic, or any other suitable substance that will permit light to travel between the mirror 124 and the exterior of the enclosure 126 (e.g., as at arrow 168 in FIG. 5). The light-permeable barrier 176 may be positioned at an orientation that exhibits a low risk of dust or other particulate accumulation. For example, the light-permeable barrier 176 is shown in solid lines at an orientation that is substantially vertical, such that falling particulate is unlikely to drop from above to rest on the face of the light-permeable barrier 176. As an alternative, the light-permeable barrier 176A is shown in phantom lines at an orientation in which the top of the light-permeable barrier 176 extends further away from the body 130 or interior of the enclosure 126 than an amount by which the bottom of the light-permeable barrier 176 extends. Such a downward slope may yield an exposed surface that is unlikely to accumulate particulate due to the particulate being under the pull of gravity if contacting the exposed surface. Additionally, the light-permeable barrier 176 is shown in both solid lines and phantom lines in respective positions in which it is at least partially recessed under an overhang and thus at a reduced risk for accumulating particulate that is falling from above. In some embodiments, blocking the third passage 136 with the light-permeable barrier 176 enables a lower capacity of the gas flow system 128 to be used to effectively exclude dust or other particulate from the mirror 124 than might otherwise be possible if gas flow is provided through both the second passage 134 and the third passage 136. In some embodiments (such as when the light-permeable barrier 176 may be arranged non-perpendicularly to a path of light passing as at 168 from the mirror 124 through the second passage 136), the light-permeable barrier 176 may include a curvature or otherwise be subjected to a treatment to account for any deflection or refraction of light that may occur due to the arrangement of the barrier 176 relative to the mirror 124.

FIG. 6 illustrates an enclosure 126 having a different arrangement of the upper lateral passage 134 than that shown in FIG. 3. For example, the arrangement shown in FIG. 6 may facilitate the incident ray αI being aligned along a different incoming path 166' than the inbound path 166 of FIG. 3. As noted earlier, this deviation may allow the enclosure 126 to be positioned (e.g., at point P in FIG. 1) on the same side of the gap 112 as the camera 122F yet still adequately reflect the light toward the camera 122F from the gap 112. FIG. 6 shows an example of the incident angle αI and the reflected angle αR each being greater than 45 degrees. Alternatively, the incident angle αI and the reflected angle αR may be equal to 45 degrees, for example, to facilitate placement of the enclosure 126 directly beneath the gap 112.

Other features are also shown in FIG. 6. In contrast to FIG. 3, FIG. 6 shows a mirror mount 148 that is entirely located within the enclosure 126 (e.g., does not penetrate the enclosure 126). Moreover, the mirror mount 148 in FIG. 6 is shown as a fixed mount, rather than adjustable such as via the adjustable base 175 of FIG. 3. However, any features of other arrangements shown or described herein (e.g., of FIG. 3 or 4) may be included in FIG. 6 or vice versa to achieve desired functionality. For example, in some embodiments, the adjustable base 175 may be located entirely within the enclosure 126, e.g., such that the mirror 124 can be adjusted upon opening the enclosure 126 using the features described with FIG. 4. As another example, in some embodiments, the adjustable base 175 may be coupled with an outside of the enclosure 126 or otherwise operable to adjust an orientation of the entire enclosure 126 and/or associated components.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A scanning assembly, comprising:
  a conveying system configured to transport an item along a first direction, the conveying system including a gap that extends in the first direction and a second direction, the second direction being perpendicular to the first direction;
  an enclosure spaced apart from the gap in at least the second direction, the enclosure comprising a first passage, a second passage, and a third passage;
  a gas flow system coupled with the first passage for supplying gas flow out at least through the second passage;
  a mirror positioned within the enclosure at an angle that causes light received in through the second passage to be reflected out through the third passage; and
  an optical sensor spaced apart from the gap in the second direction and spaced apart from the gap in a third direction, the third direction being parallel the first direction, the optical sensor positioned so as to receive light passed downwardly through the gap and through the second passage, reflected off of the mirror, and passed through the third passage.

2. The scanning assembly of claim 1, wherein the enclosure further comprises:
a body;
a first projection extending away from the body and defining at least a part of the first passage;
a second projection extending away from the body and defining a slot therethrough that defines at least a part of the second passage; and
a third projection extending away from the body and defining another slot therethrough that defines at least a part of the third passage.

3. The scanning assembly of claim 1, wherein the third passage is arranged to enable gas flow supplied by the gas flow system out through the third passage.

4. The scanning assembly of claim 1, further comprising a light-permeable barrier positioned within the third passage so as to permit passage of light through the third passage and block gas flow through the third passage.

5. The scanning assembly of claim 4, wherein a top of the light-permeable barrier extends further away from the mirror relative to a bottom of the light-permeable barrier.

6. The scanning assembly of claim 1, wherein the enclosure comprises a body that includes a first body portion releasably connected to a second body portion so as to enable access to the mirror when at least a portion of the first body is released from at least a portion of the second body.

7. The scanning assembly of claim 1, wherein the conveying system includes a first conveyor and a second conveyor and the gap is disposed between the first conveyor and the second conveyor.

8. The scanning assembly of claim 1, wherein the enclosure further comprises an adjustable mount that adjustably secures the mirror within the enclosure.

9. A mirror enclosure assembly, comprising:
a mirror having a surface of reflection that defines a plane, the plane having a reflection point that defines a first line that extends normal to the plane from the reflection point;
an enclosure having a body that defines a cavity in which the mirror is disposed, the body further defining a first outlet and a second outlet, the first and second outlets being configured such that a second line that extends through the first outlet to the reflection point forms a first angle with the first line that is equal to a second angle formed by the first line and a third line that extends from the reflection point through the second outlet; and
a gas flow system configured to direct gas outwardly from the enclosure along the second and third lines.

10. The mirror enclosure assembly of claim 9, wherein the first angle and the second angle are less than 45 degrees.

11. The mirror enclosure assembly of claim 9, wherein the first angle and the second angle are greater than 45 degrees.

12. The mirror enclosure assembly of claim 9, further comprising a light-permeable barrier positioned within the second outlet and configured so as to enable passage of light through the second outlet and inhibit gas flow through the second outlet.

13. The mirror enclosure assembly of claim 9, wherein the enclosure further comprises:
a first projection that extends away from the body along the second line and defines at least a part of the first outlet; and
a second projection that extends away from the body and along the third line and defines at least a part of the second outlet.

14. The mirror enclosure assembly of claim 13, wherein the body includes a first body portion releasably connected to a second body portion so as to enable access to the mirror when at least a portion of the first body is released from at least a portion of the second body.

15. A method of scanning an item using an assembly comprising a conveying system that includes a gap; a mirror disposed within an enclosure, the enclosure comprising a first passage, a second passage, and a third passage; a gas flow system coupled with the first passage of the enclosure; and an optical sensor, the method comprising operations including:
moving the item along the conveying system in a first direction over the gap;
as the item is moving over the gap, scanning a portion of the item using the optical sensor, the optical sensor receiving light passed from the item through the gap, through the second passage, reflected on the mirror, and through the third passage; and
blowing gas into the enclosure through the first passage, the blowing resulting in gas passing out of the enclosure through the second passage.

16. The method of claim 15, wherein the blowing operation further results in gas passing out of the enclosure through the third passage.

17. The method of claim 15, wherein the blowing operation further includes using a light-permeable barrier positioned within the third passage to inhibit gas passing out of the enclosure through the third passage.

18. The method of claim 15, wherein the moving operation includes moving the item from a first conveyor of the conveying system over the gap to a second conveyor of the conveying system.

19. The method of claim 15, wherein the enclosure comprises a body that includes a first body portion releasably connected to a second body portion and the method further comprises operations of:
releasing at least a portion of the first body from at least a portion of the second body; and
cleaning the mirror.

20. The method of claim 15, wherein the enclosure further comprises an adjustable mount and the method further comprises the operation of:
adjusting a position of the mirror relative to the enclosure.

* * * * *